April 20, 1943.   G. F. HEIMBERGER   2,316,864
MICROMETER GAUGE
Filed April 19, 1941   2 Sheets-Sheet 1
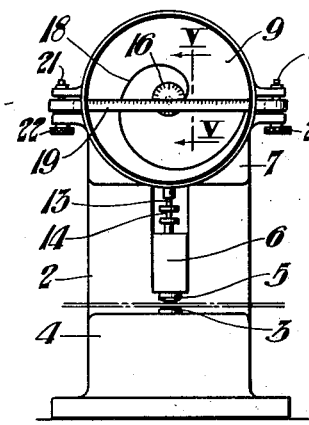
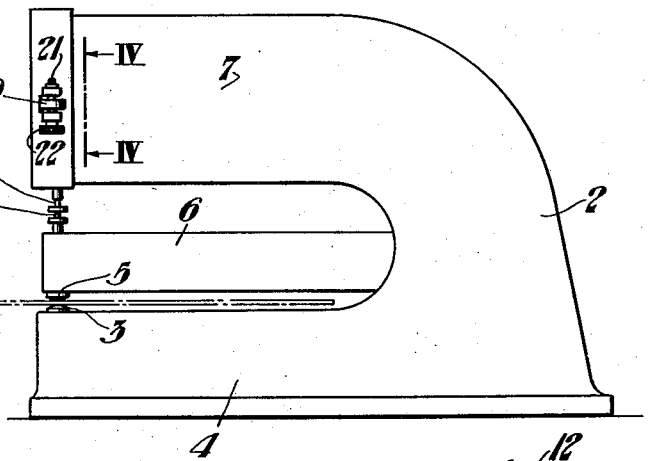
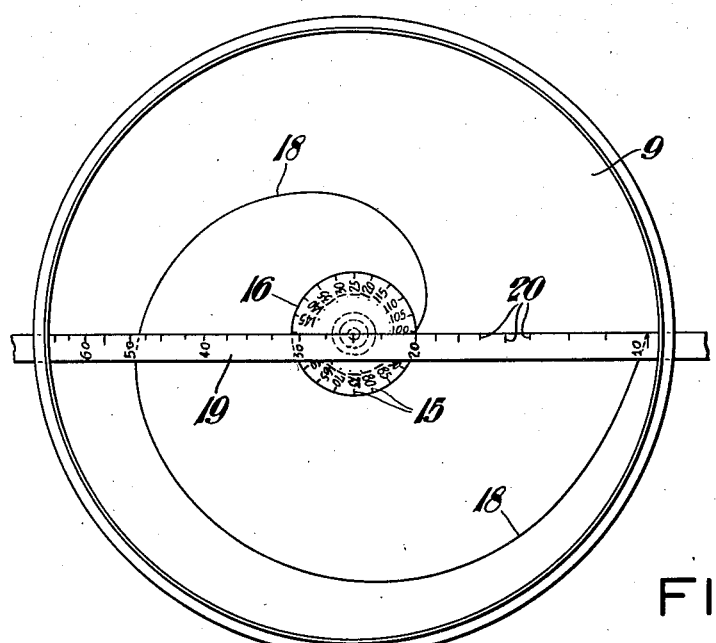
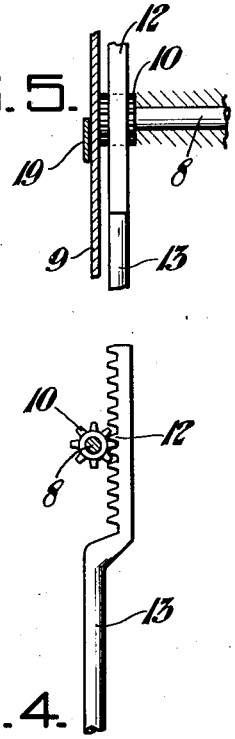
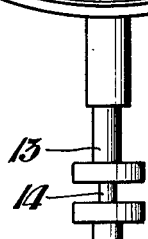
Inventor:
GEORGE F. HEIMBERGER,
by: John E. Jackson
his Attorney.

April 20, 1943.　　G. F. HEIMBERGER　　2,316,864
MICROMETER GAUGE
Filed April 19, 1941　　2 Sheets-Sheet 2

Inventor:
GEORGE F. HEIMBERGER,
by: John E. Jackson
his Attorney.

Patented Apr. 20, 1943

2,316,864

UNITED STATES PATENT OFFICE 2,316,864

MICROMETER GAUGE

George F. Heimberger, McKeesport, Pa.

Application April 19, 1941, Serial No. 389,443

7 Claims. (Cl. 33—147)

This invention relates to gauges for determining the thickness of material, and particularly to an improved micrometer gauge having means arranged therewith for indicating other dimensions, such as length.

In the steel industry, flat metallic stock or plate is sometimes made from bar stock. In such procedure a piece of rod material or bar stock of the proper dimensions is provided so as to produce a plate of the required thickness and length after reduction by rolling. That is, a piece of raw material or bar stock having the proper thickness and length is selected so as to produce, after rolling, a finished plate of the required thickness and length. It will be understood that the area of a section in a longitudinal direction through the piece of raw material or bar stock before reduction is substantially the same as that through the finished rolled plate after reduction; also, of course, the volume of the piece will remain constant.

Heretofore, the proper length of bar stock of any given thickness that should be used to produce a finished rolled flat of the required thickness and length was calculated mathematically, but such a method is tedious and inconvenient. Furthermore, the orders for such finished rolled plates usually vary materially in length and thickness and, of course, each had to be figured independently of the other, which cut down the rate of production materially. Also, the raw material, or bar stock from which the plate is to be rolled usually does not have a uniform thickness throughout its length but varies materially in thickness from one end to the other.

In the present invention there is provided a device or gauge in which the thickness of the raw material or bar stock can be gauged, having means arranged therewith for indicating directly the proper length the bar stock should be cut to produce a plate of the required thickness and length after reduction by rolling, thereby eliminating the need of any mathematical calculating at the time of measuring the raw material.

Accordingly, it is the general object of the present invention to provide an improved gauge or device by which the values of the thickness and length of a piece of material can be directly determined for producing a piece of finished material of the required thickness and length after reduction so that the area of a section in a longitudinal direction through the raw material before reduction is substantially equal to that after reduction.

It is another object of the invention to provide a means incorporated with a micrometer gauge whereby the length of the raw material of any given thickness is directly and accurately indicated to produce a finished piece of material, after reduction, having the required dimensions.

It is a further object of this invention to provide means incorporated with a micrometer gauge for indicating directly the length a piece of raw material should be cut to produce a finished piece of material, after reduction, of the proper dimensions which is simple and inexpensive in its construction and, at the same time, a means which is efficient and effective in its use.

Various other objects and advantages of this invention will become more apparent during the course of the following specification and will be particularly pointed out in the appended claims.

In the accompanying drawings there is shown, for the purpose of illustration, one embodiment which my invention may assume in practice.

In these drawings:

Figure 1 is a front elevation of the improved gauge of my invention;

Figure 2 is a side elevation thereof;

Figure 3 is an enlarged detail view of the gauge showing the dial together with the length scale associated therewith, as shown in Figure 1;

Figure 4 is a section taken on line IV—IV of Figure 2;

Figure 5 is a section taken on line V—V of Figure 1; and

Figure 6:
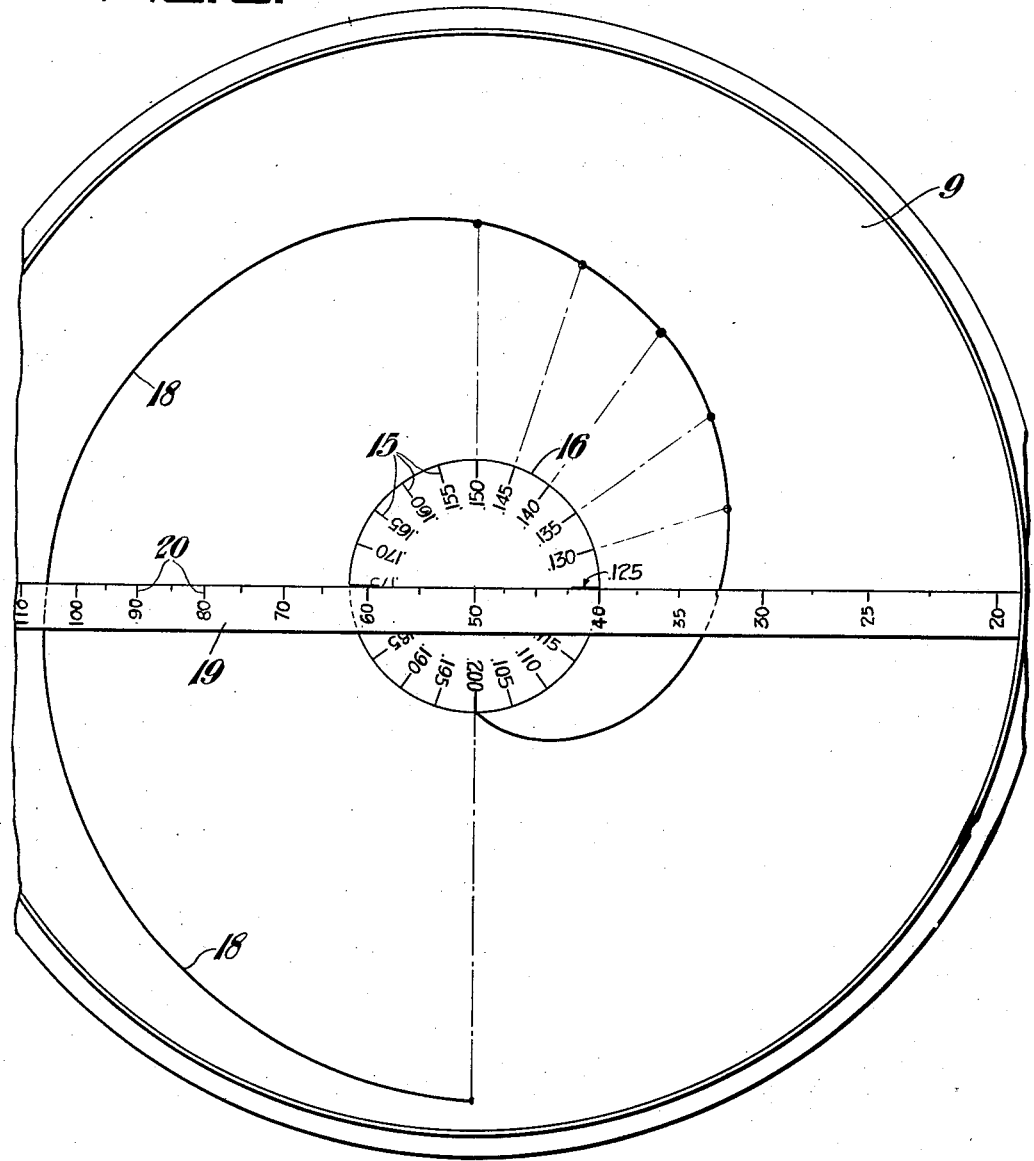
Figure 6 is an enlarged detail of the dial together with the length scale similar to Figure 3, showing one position the dial and length scale might assume in practice.

Referring more particularly to the drawings, the improved means of my invention is shown incorporated with a heavy duty micrometer gauge, but it will be understood that it may be conveniently used with any other type micrometer gauge or the like. The gauge shown comprises a yoke-like frame member 2 for holding the sheet or stock to be gauged, having a stationary anvil 3 arranged in the lower arm 4 thereof and a movable anvil 5 arranged in the upper arm 6 thereof directly opposite from the lower anvil with the anvils adapted to act as a clamping mechanism for securely holding the sheet or stock to be gauged. The upper arm 6 is preferably pivoted or movably arranged relative to the lower arm 4 and adapted to be actuated by any suitable means (not shown) so as to clamp the sheets or stock between the anvils, 3 and 5. There is arranged above the upper arm 6 another arm or outwardly extending portion 7.

According to the present invention, there is mounted in the outer end of the arm 7 a shaft 8 on which there is securely arranged a rotatable disk or dial 9. There is also carried by the shaft 8 a pinion gear 10 which is adapted to cooperate with a gear rack 12 having a downwardly extending spindle 13 arranged therewith. The lower end of the spindle 13 is adapted to contact at all times the upper end of the movable anvil 5, as at 14, and to be moved thereby.

There is arranged, preferably on the outer face of the disk or dial 9, preferably in a circular arrangement, a plurality of calibrations 15 for indicating the thickness of the material being gauged. In the present instance, as shown in Figures 3 and 6 of the drawings, there is provided a circle 16 which is inscribed on the disk or dial 9 having the calibrations arranged therearound and which is divided into equal segments. Generally the spindle of a micrometer is arranged so that it travels reciprocably a distance of .025 of an inch on one revolution thereof, but in the present case the spindle 13 is arranged so that it travels reciprocably in a vertical plane one-tenth of an inch upon one revolution of the disk or dial 9 through the action of hte pinion gear 10 and the gear rack 12 with which it meshes. For the purpose of illustration, the range of the gauge as shown in from .100 to .200 of an inch, but it will be understood that any other desirable micrometer limitations may be used. Accordingly, the micrometer spindle 13 on one revolution of 360° of disk 9 will move reciprocably one-tenth of an inch. Therefore, in order to provide equal increments around the circle 16, the calibrations are inscribed on the disk at equal intervals around the circle, i. e., the circle 16. In the present case, the circle is divided into .005 of an inch divisions. The position of such division marks is obtained by multiplying 360° by .005 of an inch, which equals 18°. Therefore, the circle 16 is divided into divisions of 18° and the .005 of an inch divison marks are arranged therearound at each corresponding mark, i. e., one mark is labeled .100 and the successive marks around the circle are labeled .105, .110, .115, etc., through one-tenth of an inch to two-tenths of an inch and the .200 of an inch mark will correspond with the .100 of an inch mark, as shown in Figures 3 and 6, which will be denoted as the common radial division.

There is also arranged, preferably on the outer face of the disk or dial 9, a logarithmic curve 18 which is calibrated and developed, by plotting the corresponding logarithm against the arithmetic radial division of the micrometer spindle movement as will be described. The logarithmic values for the corresponding arithmetical radial divisions (i. e., the gauge readings) are first obtained from a logarithmic table and some of them are as follows:

| Arithmetical radial division | Logarithmic value |
|---|---|
| .100 | 0 |
| .105 | .02119 |
| .110 | .04139 |
| .125 | .09691 |
| .150 | .17609 |
| .175 | .24304 |
| .200 | .30103 |

Any arbitrary distance may be selected for the radial distance through which it is desired that the logarithmic curve travel in one revolution of the disk 9; that is, the distance the logarithmic curve travels radially from .100 calibration to the .200 calibration through one revolution. This distance is measured radially outwardly from the circle 16 and divided so as to correspond to the logrithmic values of from .100 to .200 (i. e., zero to .30103.) so as to provide 30103 units from .100 to .20C.

These logarithmic values are then plotted on their corresponding radial divisions. That is, zero is plotted at .100, on the circle 16, and the point on radial division .105 is plotted thereon at a distance of 02119 units from the circle 16; the point on radial division .110 is plotted thereon at a distance of 04139 units from the circle 16. Such procedure is followed around the circle or axis of the disk until points are plotted on each radial division of .005 intervals at a distance from the circle 16 equal to their corresponding logarithmic value and the point on division .200 will be on the same radial division as zero or on radial division .100, at a distance of 30103 units from the circle 16. A smooth curve is then drawn beginning at zero on the .100 division through the points on the several radial divisions to the point on .200 division, as shown in Figure 3, so as to provide the smooth logarithmic curve 18.

On the front side of the disk or dial 9, there is arranged a movable member or sliding scale, preferably a steel tape 19, which is diametrically arranged across the disk with preferably the upper edge thereof being on a line passing diametrically through the center of the same. There is arranged on the face of the tape, preferably along the upper edge thereof, calibrations 20 representing length and factors preferably calibrated logarithmically which are adapted to cooperate with the logarithmic curve 18 in a manner hereinafter to be described. There is mounted to each side of the disk 9 a suitable reeling mechanism with each consisting preferably of a stud shaft 21 having a knurled thumb screw 22 carried thereby for reeling and moving the tape 19 in either direction across the face of the disk.

The factor, as used throughout this specification, is the product of the length and thickness of the material, and the factor is calibrated digitately equal to the length. Thus, it will be seen that the factor and the length can be represented on the same scale.

The calibrations 20 on the sliding scale or tape 19 are calibrated relative to the logarithmic curve 18 on the disk by one of several ways. They may be calibrated mathematically by projection of the corresponding values on the logarithmic curve or they may be found by calculating the length required for any particular gauge and plotting these points at the corresponding intersection of the edge of the tape and the logarithmic curve, as follows:

For example, to calibrate the scale for length from 10 to 20 inches, a mark representing the integer 10 is inscribed or marked on the tape 19, preferably at a point adjacent the right end thereof. The disk 9 is then turned or rotated and the tape moved so that the point plotted on the .200 radial division of the disk, or the common radial division, which is the extreme end of the logarithmic curve 18, is positioned directly opposite and in line with the 10 integer mark on the tape, as shown in Figure 3 of the drawings. With the disk 9 and the tape so set, a mark representing the integer 20 is then inscribed or marked on the tape at a point directly opposite and in line with the point plotted on the .100 radial division, which is directly opposite the circle 16, at the origin of the logarithmic curve on the common radial division. This is done for the reason that the integer at .100 on the disk must be twice the factor at .200 on the disk. It will be noted then that the arithmetical unit distance between .100 and .200 on the tape is equal to 30103 units, or the same as the distance between the plotted point on the .100 or common radial division and the plotted point on the .200 or common radial division.

The intermediate points for marking the tape between the lengths 10 and 20 for ascertaining length therebetween are located as follows. For example, the logarithm of 19 is found to be .27875 and the mark representing the integer 19 is marked or inscribed on the tape at a distance of 27875 units from the mark representing the integer 10, or 30103 minus 27875, which equals 2228 units from the mark representing the integer 20. Likewise, the marking of any other integers between 10 and 20 is located by finding their logarithm and inscribing the mark representing the corresponding particular integer at a distance equal to its logarithmic value from the marking representing integer 10. The points for positioning some of such markings are shown in the following table:

| Factor | Gauge in inches | Length to cut in inches | Log. of length to cut | .30103 minus logarithm of length to cut |
|---|---|---|---|---|
| 2.00 | .100 | 20 | .30103 | 0 |
| 2.00 | .10526 | 19 | .27875 | .02228 |
| 2.00 | .1111 | 18 | .25527 | .04576 |
| 2.00 | .1176 | 17 | .23045 | .07058 |
| 2.00 | .125 | 16 | .20412 | .09691 |
| 2.00 | .200 | 10 | 0 | .30103 |

As has been explained, the value obtained from subtracting the logarithm of the length from .30103 is measured from the point of intersection of the mark representing integer .200 and the circle 10 along the tape 19 and the mark of the corresponding length is inscribed thereon.

The above procedure is followed accordingly for obtaining a range of lengths between 20 and 40; 40 and 80; 80 and 160; etc., as is shown for obtaining the ranges between 20 and 40, as follows. The tape 19 is moved to the right so that the mark representing the integer 20 is in line with the end of the logarithmic curve 18 on the .200 or common radial division, as shown in Figure 6, a position which the integer 10 had hereinbefore assumed. A mark representing the integer 40 is then inscribed or marked on the tape 19 at a point opposite the circle 16 or the origin of the logarithmic curve thereon. The logarithm of 40 is found to be .60206. The logarithm of 39 is .59106, and subtracting .59106 from .60206 gives .01100. The mark representing the integer 39 is then marked or inscribed on the tape at a point 1100 units from the mark representing integer 40 or from the circle 16. Likewise, as before, the marking of any particular integer between 20 and 40 is located by finding its logarithm and subtracting the same from .60206, the logarithm of 40, and inscribing or marking the particular mark representing that integer at that distance equal to the remainder along the tape. The points for positioning some of such marking are shown in the following table:

| Factor | Gauge in inches | Length to cut in inches | Log. of length to cut | .60206 minus logarithm of length to cut |
|---|---|---|---|---|
| 4.00 | .100 | 40 | .60206 | 0 |
| 4.00 | .1026 | 39 | .59106 | .01100 |
| 4.00 | .10526 | 38 | .57978 | .02228 |
| 4.00 | .1111 | 36 | .55630 | .04576 |
| 4.00 | .1176 | 34 | .53148 | .07058 |
| 4.00 | .125 | 32 | .50515 | .09691 |
| 4.00 | .200 | 20 | .30103 | .30103 |

The construction of my improved gauge having been described, it operates in the following manner. The factor hereinbefore referred to, and as has been explained, is the product of the length and thickness of the material. The length of the piece of raw material required is determined by the factor divided by the gauge or thickness of the raw material. For example, the size of any particular piece of material after reduction is .050 multiplied by 80 inches in length equals a factor of 4.0. The width of the material does not enter into the calculation. As has been hereinbefore stated, the calibrations 20 on the tape 19 represent both the factor and the length with the length being in the units shown and the factor being one-tenth of the units shown. For example, the calibration marked 40 represents both a length in inches of 40 and a factor of 4.0.

To determine the exact length for any gauge of material by means of the present gauge, the calibration representing the proper factor on tape 19 is set directly opposite and in line with the circle 16 inscribed on the disk 9. The material to be gauged is then placed in the gauge between the anvils 3 and 5, and the disk 9 turns as the upper anvil 5 is moved, as has been explained, through the action of the spindle 13, the gear rack 12, and the pinion gear 10 carried by the shaft 8. The required length for any gauge is then determined by noting the calibration 20 on the tape 19 at the intersection of the logarithmic curve 18 on disk 9 with the upper edge of the tape 19 and the logarithmically calibrated scale representing length inscribed thereon. For example, if the material is to have a thickness of .050 of an inch and a length of 80 inches after reduction, the factor would be .050 multiplied by 80, which equals 4.0. The calibration representing factor 4 on tape 19 is then set directly opposite the circle 16 on the disk. The material is then placed in the gauge and supposing it registers a thickness of .125 of an inch, the logarithmic curve 18 on disk 9 would then intersect the upper edge of the tape 19 at a point directly opposite the calibration marked 32 thereon. Therefore, the required length of material would have to be cut 32 inches in length to obtain a piece of material after reduction having the above mentioned finished dimensions.

As a result of my invention, it will be seen that there is provided a gauge or device whereby the actual gauge and length to be cut or the length of the raw material to be provided are simultaneously indicated for securing a constant sectional area in a longitudinal direction before and after reduction. Furthermore, with the use of such a gauge a constant weight bar will be assured before and after reduction, thereby reducing the amount of scrap to a minimum. Also, by using the gauge of my invention, it will be seen that the rate of cutting and production will be increased due to the fact that the length and thickness are directly indicated.

While I have shown and described one specific embodiment of my invention, it will be understood that this embodiment is merely for the purpose of illustration and description and that various other forms may be devised within the scope of my invention, as defined in the appended claims.

I claim:

1. In combination with a micrometer of the class described having a spindle arranged for reciprocable movement, rotatable means arranged with said spindle and which is rotatably actuated thereby upon reciprocable movement of said spindle, a logarithmic curve carried by said rotatable means which is calibrated by plotting the corresponding logarithm opposite the arithmetical radial division of the spindle movement, a member which is movable relative to said means and mounted adjacent thereto directly opposite the logarithmic curve carried thereby, and a logarithmic scale carried by said movable member which is correlated to the logarithmic curve carried by said rotatable means with the calibrations of the logarithmic scale representing length, and area factor which is the product of length and thickness, the logarithmic curve of said rotatable means adapted to cooperate with the correlated logarithmic scale of said movable member upon rotation of said rotatable means so as to intersect said scale with the point of intersection of said curve and said scale indicating on said scale the length of the material required to fulfill the area factor.

2. In combination with a micrometer of the class described having a spindle arranged for reciprocable movement, a rotatable member which is actuated by said spindle upon reciprocable movement thereof, a logarithmic curve carried by said rotatable member which is calibrated by plotting the corresponding logarithm opposite the arithmetical radial division of the spindle movement, a longitudinally extending member arranged adjacent said rotatable member and for movement relative thereto directly opposite the logarithmic curve carried thereby, and a logarithmic scale carried by said movable member which is correlated to the logarithmic curve carried by said rotatable member with the calibrations of the logarithmic scale representing length, and area factor which is the product of the length and thickness, the logarithmic curve of said rotatable member adapted to cooperate with the correlated logarithmic scale of said movable member upon rotation of said rotatable member so as to intersect said scale with the point of intersection of said curve and said scale indicating on said scale the length of the material required to fulfill the area factor.

3. In combination with a micrometer gauge of the class described having a spindle arranged for reciprocable movement, a rotatable disk member which is actuated by said spindle upon reciprocable movement thereof, a logarithmic curve arranged on one face of said disk which is calibrated by plotting the corresponding logarithm opposite the arithmetical radial division of the spindle movement, a longitudinally extending member disposed directly opposite said disk and the logarithm curve carried thereby and arranged for movement diametrically thereacross, and a logarithmic scale carried by said movable member which is correlated to the logarithmic curve carried by said disk with the calibrations of the logarithmic scale representing length, and area factor which is the product of the length and thickness, the logarithmic curve of said disk adapted to cooperate with the correlated logarithmic scale of said movable member upon rotation of said rotatable member so as to intersect said scale with the point of intersection of said curve and said scale indicating on said scale the length of the material required to fulfill the area factor.

4. In combination with a micrometer gauge of the class described having a spindle arranged for reciprocable movement, a rotatable disk member which is actuated by said spindle upon reciprocable movement thereof, calibrations arranged circularly on the face of said disk around the axis thereof in increments of one-tenth of an inch for indicating the thickness of the material being gauged, a logarithmic curve arranged on the face of said disk, which is calibrated by plotting a plurality of points opposite a plurality of increments of one revolution around the axis of said disk with said points being spaced from a circle inscribed around said axis a distance equal to the logarithmic value of the corresponding increment with a smooth curve drawn through said points whereby a logarithmic curve is provided for at least one revolution of said disk, a longitudinally extending slidable member disposed directly opposite said disk and the logarithmic curve carried thereby and arranged for movement diametrically thereacross, and a logarithmic scale arranged along one edge of said movable member which is correlated to the logarithmic curve carried by said disk with the calibrations of the logarithmic scale representing length, and area factor which is the product of length and thickness, the logarithmic curve of said disk adapted to cooperate with the correlated logarithmic scale of said slidable member upon rotation of said disk so as to intersect said scale with the point of intersection of said curve and said scale indicating on said scale the length of the material required to fulfill the area factor.

5. A device of the class described, including a frame member, a spindle mounted for reciprocable movement on said frame member, a stationary means arranged opposite said spindle on said frame with the material to be gauged adapted to be positioned between said spindle and said stationary means, a disk mounted for rotatable movement which is responsible to the reciprocable movement of said spindle, a logarithmic curve arranged on the face of said disk which is calibrated by plotting a plurality of points opposite a plurality of increments of one revolution of said disk with each point being the corresponding logarithm of the opposed arithmetical radial division of the movement of the disk and spindle, and means arranged adjacent said disk directly opposite the logarithmic curve carried thereby for diametrical movement relative to said disk, and a logarithmic scale arranged on said movable means which is correlated to the logarithmic curve carried by said disk with the calibrations of the logarithmic scale representing length, and area factor which is the product of length and thickness, the logarithmic curve of said disk adapted to cooperate with the correlated logarithmic scale of said movable means upon rotation of said disk so as to intersect said scale with the point of intersection of said curve and said scale indicating on said scale the length of the material required to fulfill the area factor.

6. A device of the class described, including a frame member, a spindle mounted for reciprocable movement on said frame member, stationary means arranged opposite said spindle on said frame member with the material to be gauged adapted to be positioned between said spindle and said stationary means, a disk mounted for rotatable movement which is responsive to the reciprocable movement of said spindle, a logarithmic curve arranged on the face of said disk which is calibrated by plotting the corresponding logarithm opposite the arithmetical radial division of the spindle movement, a slidable member disposed directly opposite said disk and the logarithmic curve carried thereby and arranged for movement diametrically thereacross, and a logarithmic scale arranged along one edge of said slidable member which is correlated to the logarithmic curve carried by said disk with the calibrations of the logarithmic scale representing length, and area factor which is the product of length and thickness, the logarithmic curve of said disk adapted to cooperate with the correlated logarithmic scale of said slidable member upon rotation of said disk so as to intersect said scale with the point of intersection of said curve and said scale indicating on said scale the length of the material required to fulfill the area factor, and means for moving said slidable member across the face of said disk.

7. A device of the class described, including a frame member, a spindle mounted for reciprocable movement on said frame member, stationary means arranged opposite said spindle on said frame member with the material to be gauged adapted to be positioned between said spindle and said stationary means, a disk mounted for rotatable movement which is responsive to the reciprocable movement of said spindle, a logarithmic curve arranged on the outer face of said disk which is calibrated by plotting the corresponding logarithm opposite the arithmetical radial division of the spindle movement, a flexible scale member disposed directly opposite the outer face of said disk and the logarithmic curve carried thereby and arranged for movement diametrically thereacross, a logarithmic scale arranged along one edge of said flexible member which is correlated to the logarithmic curve carried by said disk with the calibrations of the logarithmic scale representing length, and area factor which is the product of length and thickness, the logarithmic curve of said disk adapted to cooperate with the correlated logarithmic scale of said flexible member upon rotation of said disk so as to intersect said scale with the point of intersection of said curve and said scale indicating on said scale the length of the material required to fulfill the area factor, and means for moving said flexible scale in either direction across the face of said disk.

GEORGE F. HEIMBERGER.